United States Patent [19]

Hopff et al.

[11] Patent Number: 4,729,263
[45] Date of Patent: Mar. 8, 1988

[54] PRESSURE REGULATING ARRANGEMENT WITH A DAMPING DEVICE FOR A CONTROL PRESSURE OF AN AUTOMATIC CHANGE-SPEED TRANSMISSION

[75] Inventors: Christoph Hopff, Ditzingen; Ludwig Bauer, Stuttgart, both of Fed. Rep. of Germany

[73] Assignee: Daimler-Benz Aktiengesellschaft, Stuttgart, Fed. Rep. of Germany

[21] Appl. No.: 895,213

[22] Filed: Aug. 11, 1986

[30] Foreign Application Priority Data

Aug. 10, 1985 [DE] Fed. Rep. of Germany ....... 3528789

[51] Int. Cl.$^4$ .............................................. B60K 41/04
[52] U.S. Cl. ........................................ 74/867; 74/865
[58] Field of Search ................. 74/865, 867, 868, 853, 74/854, 863

[56] References Cited

U.S. PATENT DOCUMENTS

| | | | |
|---|---|---|---|
| 3,623,383 | 11/1971 | Sheppard | 74/865 |
| 4,086,009 | 4/1978 | Lentz | 74/867 X |
| 4,291,595 | 9/1981 | Jelaca | 74/867 X |
| 4,418,587 | 12/1983 | Kauffman | 74/865 X |
| 4,466,312 | 8/1984 | Oguma | 74/867 X |
| 4,555,964 | 12/1985 | Sueano | 74/865 X |
| 4,627,313 | 12/1986 | Sakai | 74/867 |

OTHER PUBLICATIONS

Publication 6510 6801 00-0483-2,5, Daimler-Benz.

*Primary Examiner*—Lawrence Staab
*Assistant Examiner*—David Novais
*Attorney, Agent, or Firm*—Barnes & Thornburg

[57] ABSTRACT

In a pressure-regulating arrangement for the control pressure of a shifting arrangement of a change-speed transmission, a slide valve member is actuatable by an adjusting sleeve connected with a control member of a driving engine by way of a pressure member. A hydraulic damping device with two mutually relatively movable damping parts of the piston-cylinder-type construction is provided in which one damping part is adapted to be supported with respect to the housing and the other is actuatable by way of the pressure member and damping medium is thereby displaced against the action of a throttle. In order to improve the control behavior by decoupling the damping function from the control slide valve member, the damping device is arranged at the end face of the control slide valve member facing the pressure member and the damping part movable relative to the housing is connected with the pressure member while a damping chamber enclosed between the damping parts is connected by way of a relief valve with a space under atmospheric pressure.

28 Claims, 1 Drawing Figure

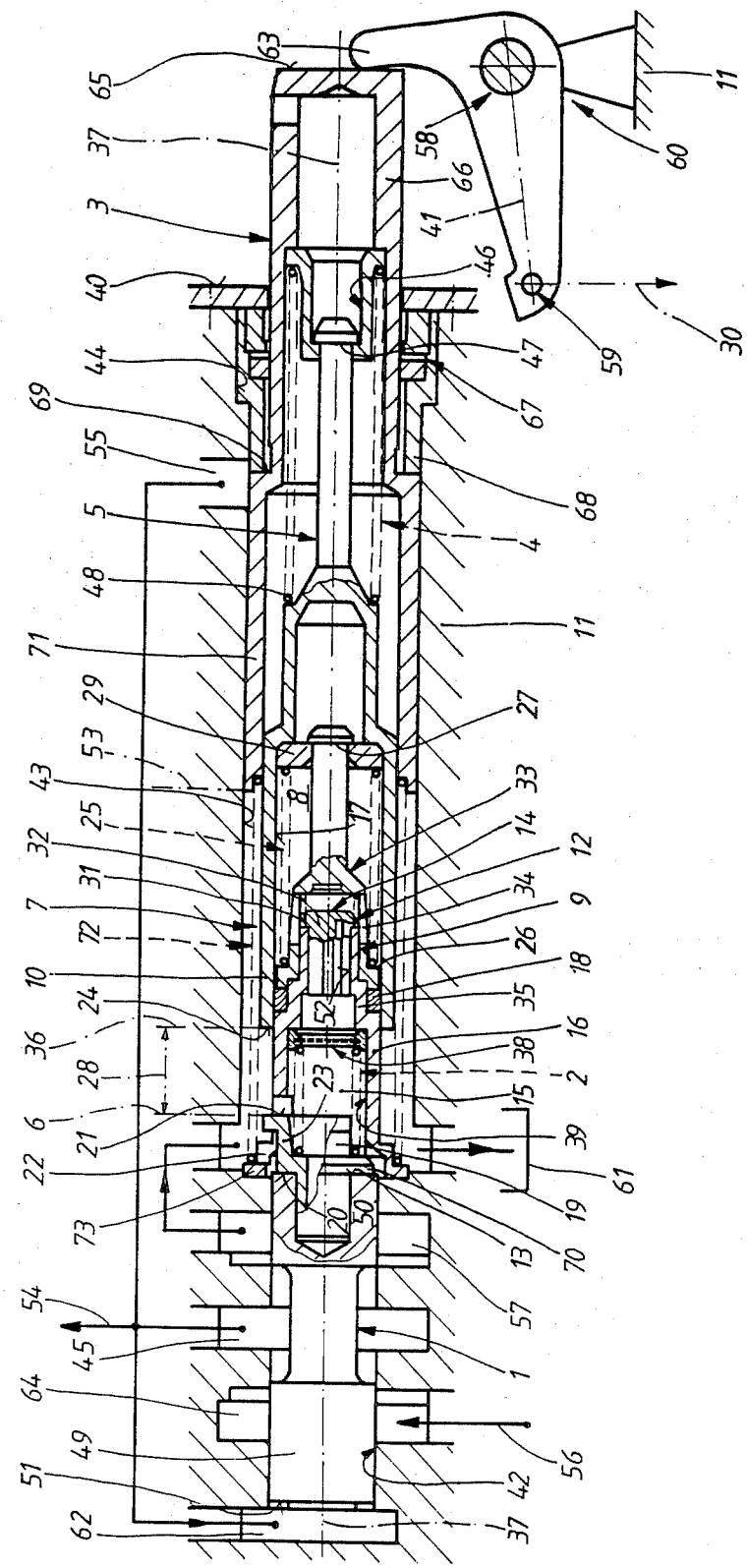

PRESSURE REGULATING ARRANGEMENT WITH A DAMPING DEVICE FOR A CONTROL PRESSURE OF AN AUTOMATIC CHANGE-SPEED TRANSMISSION

The present invention relates to a pressure-regulating arrangement for a control pressure of a shifting mechanism of an automatic change-speed transmission arranged behind the driving engine in the direction of power transmission which is used for triggering shifting back operations.

In a known pressure-regulating arrangement of this type (Printed Publication No. 6 510 6801 00-0483 2,5 of Daimler-Benz A.G., Stuttgart-Untertuerkheim), the control spool or slide valve member is constructed at its end face opposite to the adjusting sleeve in one piece with the damping member operating as cylinder so that for achieving a damping action relatively large stroke movements of the control slide valve member are necessary which, however, affect the regulating behavior disadvantageously.

On the other hand, a delay of the response of the control slide valve member which is effected by the damping device, with respect to the signal action of the adjusting sleeve is desirable under certain circumstances.

Thus, fuel-economizing shifting programs of fully automatic vehicle transmissions can be so constructed and designed that the highest speed is reached already at velocities below 50 km/h. This means that the engine—predominantly in the coasting operation—drops off to idling rotational speed. The oil pump which is provided for the pressure oil supply of the automatic transmission operates with the same rotational speed and supplies an oil stream correspondingly small in quantity and pressure.

During a suddenly occurring acceleration desire of the driver, such a transmission is capable of shifting back (down) at least over two speeds. The driver expresses this acceleration desire by actuation of the drive pedal whereby, on the one hand, the engine regulation is actuated in the sense of a higher engine output and, on the other, the transmission control is actuated in the sense of a shifting back.

A shifting back (shifting down) of the transmission with simultaneously increasing torque of the engine requires a sufficient availability of pressure oil in quantity and pressure which is not always assured with the vehicle condition described above from which the shifting-back is to take place.

It is therefore advantageous to gain a time-spacing between the initiation of the engine signal and of the transmission signal at the initiation of the acceleration wish by the driver by way of the actuation of the drive pedal, in the sense that initially the engine increases its rotational speed and therewith the feed quantity of the pump increases and only thereafter the shifting-back signal for the transmission is triggered. It is assured under these circumstances that the shifting-back takes place properly and orderly with sufficient pressure oil supply.

The task underlying the present invention essentially consists in improving the regulating behavior in a pressure-regulating arrangement of the type described above while assuring the pressure oil supply also when shifting down from low rotational speeds.

The underlying problems are solved according to the present invention in that the damping device is arranged on side of the end face of the control slide valve member facing the pressure member and the damping part movable with respect to the housing is immovably connected with the pressure member and the damping chamber is connected by way of breather or relief valves with a space that is at least under atmospheric pressure.

In the pressure-regulating arrangement according to the present invention, the damping function is decoupled from the control slide valve member and is placed on the pressure member actuated by the adjusting sleeve by way of a spring force so that the flow cross section controlled by the control slide valve member can be matched in its characteristics to very small stroke movements of the control slide valve member.

On the other hand, during a sudden acceleration desire of the driver, the pressure member actuated thereby by the adjusting sleeve can be brought into action on the control slide valve member only under displacement of the hydraulic damping medium against the throttling effect, i.e., with sufficient delay with respect to the revving up of the engine so that the pressure oil supply for a subsequent shifting-back is assured.

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic cross-sectional view through a pressure-regulating arrangement in accordance with the present invention.

Referring now to the single figure of the drawing, a shifting slide-valve housing 11 of a shifting arrangement of a change-speed transmission arranged behind the internal combustion engine in the direction of power transmission is secured in the customary manner (not shown) at the underside of a transmission housing in such a manner that it immerses into the oil sump 61. The housing 11 includes a housing bore which is stepped twice in diameter and thus includes three sections disposed one behind the other in relation to its bore axis 37—37, and more particularly a valve bore 42 displaceably receiving a control slide valve member or control spool 1, a cylinder bore 43 and a sealing bore 44 terminating, open as such, in a housing end surface 40.

The valve bore 42 terminates at its one end in a pressure chamber 62 of the housing 11 which is connected by way of a valve connection and an interconnected connecting channel with a control pressure channel 54 leading to command slide valves for the shifting between two speeds each of the shifting arrangement. Within its center area, the control slide valve member 1 is provided with a control groove 45 which is in constant communication with the control pressure channel 54. The control groove 45 is axially limited by one collar 49 and 50 each of the control slide valve member 1, whereby the transitions are formed each by a sharp-edged control edge which control in an alternate manner a throttle connection between the control pressure channel 54 and an annular groove 57 of the valve bore 42, on the one hand, or an annular groove 64 of the valve bore 42, on the other, or close off the control pressure channel 54 with respect to both annular grooves 57 and 64. The annular groove 57 is in communication with the oil sump 61 either directly or by way of a connecting channel with a communicating annular groove in the cylinder bore 43. The annular groove 64 is connected to a pressure line 56 which is adapted to be placed under a—preferably constant—input pressure. In this manner the control slide valve 1 is acted upon at the end face 51 which is located opposite the housing end face 40, by the regulated control pressure of the line 54. The other end face 13 of the control slide valve 1 is acted upon by the pressure—which is approximately equal to the atmospheric pressure—of a pressure chamber 15 which forms a section of the cylinder bore 43 adjoining the valve bore 42 and discharges openly into the oil sump 61.

The collar or shoulder 50 of the control slide valve member 1 which closes off in a pressure-tight manner the valve bore 42 and the pressure chamber 15 with respect to one another, has a dead-end bore, open as such, at the end face 13, into which is inserted an end pin of a pressure member 19. In its axial center area, the pressure member 19 is provided with a flange-like collar 70, from which two cross arms 23 extend radially that protrude through slot-like openings 22 of a support sleeve 16 with movement clearance; the support sleeve 16 is arranged concentrically to the bore axis 3713 37 and is used for the support at the housing of a control spring 2 which is supported at the one end face of the collar 70 that is supported with its other end face used as abutment 20 against the end face 13 of the control slide valve member 1.

The support sleeve 16 includes at its end face facing the control slide valve member 1 a radial collar 73 which is held in abutment at a shoulder of the housing 11 formed by the diameter step by means of one spring end of a return spring 72. The other spring end of the return spring 72 is supported at the inner sleeve end of an adjusting sleeve 3 which includes a piston section 71 guided pressure-tight and axially displaceable in the cylinder bore 43; the piston section 71 is thereby located between the sleeve end and a radial annular piston surface 69 that is supported under the action of the return spring 72 at the inner end face—which is used as housing abutment for the adjusting sleeve 3—of a sealing sleeve 68. The sealing sleeve 68 which is inserted movably and pressure tight into the sealing bore 44 and the adjoining section of the cylinder bore 43, includes a ring seal 67 which is used for sealing the adjusting sleeve 3 with respect to the sealing bore 44. An actuating arm 63 of a two-armed angle lever 60 engages at the outer end face 65 of the adjusting sleeve 3 whose other lever arm includes a connecting eye 59 for the fastening of a Bowden cable 30. The angle lever 60 is retained at the housing 11 by means of a pivot bearing 58 whereas the Bowden cable 30 may be connected with the throttle valve of a carburetor of an internal combustion engine which is controlled by the drive pedal.

The housing 11 includes a pressure connection 55 terminating in the cylinder bore 43 within the area of the end face of the sealing sleeve 68; the pressure connection 55, in turn, is connected by a connecting channel with the control pressure channel 54. The surfaces 51 and 69 which are acted upon by the control pressure are equally large.

By reason of its stepped diameter configuration, the central passage 39 of the support sleeve 16 forms a radial shoulder as abutment for a ring-shaped socket of a sieve 38 inserted into the passage 39 whereby the control spring 2 is supported with its adjacent spring end at the support sleeve 16 by way of the socket.

The return spring 72 is so dimensioned that the support sleeve 16 is held with its collar 73 in immovable abutment at the housing 11 under all force and pressure conditions.

The adjusting sleeve 3 operates by way of an adjusting spring 4 on a concentric inner pressure member 5 which, with its axial inner end face 24 is used for the actuation of the control slide valve member 1 by way of radial abutment surfaces 21 of the cross arms 23 of the pressure member 19 which are located radially outside of the support sleeve 16.

The adjusting spring 4 is supported between immovable spring abutments 47 and 48 of the pressure member 5 whereby an abutment sleeve 46 with corresponding spring abutments is inserted between the one spring end and the associated spring abutment 47. For the actuation of the adjusting spring 4, the adjusting sleeve 3 operates by means of an actuating abutment on an actuating abutment of the abutment sleeve 46.

The center section 35 of the support sleeve 16 which adjoins the sieve 38 carries a ring seal 18 which cooperates with an internal cylinder wall 17 that forms the section of a dead-end bore reduced in diameter of the pressure member 5 which terminates openly as such at the end face 24.

The section 35 of the support sleeve 16 passes over by way of a further diameter reduction into a reduced end section that forms a valve passage 52 for a breather or relief valve 14 which utilizes the adjoining end face 31 of the support sleeve 16 as valve seat. In this manner, a damping chamber 8 is enclosed in the interior space of the dead-end bore which is separated with respect to the pressure chamber 15 by the ring seal 18 and the breather valve 14.

The damping chamber 8 is a component of a telescopic damping device 7 of the piston-cylinder-type of construction in which the part of the support sleeve 16 including the ring seal 18, the sleeve section 35 and the relief valve 14 forms the one damping member (piston 9) and the section of the pressure member 5 having the cylinder bore 17 forms the other damping member (cylinder 10).

During a relative movement of the pressure member 5 with respect to the support sleeve 16 in the direction toward the control slide valve member 1, the volume of the damping chamber 8 is reduced so that damping medium which is contained in the damping chamber 8 is displaced by way of the adjoining valve passage 52 into the pressure chamber 15 connected with the oil sump 61 by way of a throttle 12 in the mushroom-shaped valve closure member 32 of the relief valve 14.

During a relative movement of the pressure member with respect to the support sleeve 16 in a direction pointing away from the control slide valve member 1, the volume of the damping chamber 8 increases so that as a result of the occurring pressure drop, pressure medium is forced out of the pressure chamber 15 into the damping chamber 8 by way of the relief valve 14 which now opens against the only weak spring force of a valve spring, into the damping chamber 8. The sieve 38 is series-connected for the protection of the throttle 12 against contaminations from the oil sump.

The valve spring of the relief valve 14 is supported at a spring abutment sleeve 33 for a further return spring 25 which is effectively arranged between the pressure member 5 and the support sleeve 16. The return spring 25 is supported between two mutually immovable spring abutments 26 and 27 of the spring abutment sleeve 33, whereby an abutment ring 29 provided with corresponding abutments is inserted between the spring end coordinated to the pressure member 5 and the spring abutment 27.

The abutment ring 29 cooperates by way of the one abutment with an abutment of the pressure member 5.

The spring abutment sleeve 33 which is form-lockingly mounted on the support sleeve 16 is provided with radial flow apertures 34 in order to keep the throttle 12 in communication with the damping chamber 8.

Whereas the spring abutment sleeve 33 is supported in the direction pointing toward the control slide valve member 1 at a sleeve offset delimiting the sleeve section 35, its end face facing the control slide valve member 1 is used for retaining the ring seal 18 in the opposite direction.

The operation of the described pressure-regulating arrangement is as follows:

In the illustrated idling position 41 of the angle lever 60—which is actuatable in the manner indicated in dash and dotted lines by way of the Bowden cable 30 from the carburetor throttle valve—the adjusting sleeve 3 is held in its idling position 53 by the return spring 72 which is fixed by abutment surfaces. The actuating arm 63 constantly abuts at the end face 65.

The pressure member 5 is held in its idling position 36 by the return spring 25 whereby the abutment sleeve 46 and the adjusting sleeve 3 are also held in mutual abutment. In the idling position 36, the pressure member 5 has an idling stroke 28 with respect to the pressure member 19 and thus with respect to the control slide valve member 1.

If the angle lever 60 is now pivoted counterclockwise, then a displacement of the adjusting sleeve 3 in the direction toward the control slide valve member 1 takes place necessarily. During a slow displacement, the adjusting sleeve 3 and pressure member 5 remain initially clamped together immovably with respect to one another by the adjusting spring 4 whereas the return springs 25 and 72 undergo spring movements, i.e., are compressed. This movement of the adjusting sleeve 3 is assisted by the pressure force occurring at the ring piston surface 69 whereby the abutment ring 29 leaves the spring abutment 27 and pressure medium is displaced with throttling effect out of the damping chamber 8 into the pressure chamber 15. The braking action which occurs thereby at the pressure member 5 is thereby the greater the faster its stroke movement. If the braking action exceeds the spring force of the adjusting spring 4 during more rapid displacement movements of the adjusting sleeve 3, then the adjusting spring 4 is compressed accompanied by a lifting-off of the abutment sleeve 46 from the spring abutment 47 and the pressure member 5 undergoes a delay with respect to the adjusting sleeve 3.

When the end face 24 of the pressure member 5 comes into abutment in a certain partial load position 6 at the abutment 21 of the pressure member 19 and thus the idling stroke 28 becomes zero, the relative movements of the damping members 9 and 10 with respect to one another are very small because in that case a further increase of the adjusting path of the adjusting sleeve 3 becomes effective at the pressure member 19, respectively, at the control slide valve member 1 essentially only in an increase of the spring force of the adjusting spring 4 counteracting the control pressure.

If the angle lever 60 moves in the direction towards its idling position and thus finally also the damping part 10 returns into its idling position 36, then the relief valve 14 opens as a result of the pressure drop which establishes by the volume enlargement of the damping chamber 8 so that pressure medium is now forced back out of the pressure chamber 15 which is now under the higher pressure, by way of the sieve 38 into the damping chamber 8.

This operation is connected with the lifting off of the end face 24 of the pressure member 5 from the abutment 21, as a result of which the control slide valve member 1 is again dependent alone from the regulating spring 2, i.e., a constant pressure value is adjusted over the idling stroke 28.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A pressure-regulating arrangement for regulating a control pressure of a shifting arrangement of an automatic change-speed transmission connected behind a driving engine in a direction of force transmission which is utilized for initiation of downshifting operations, comprising:

control slide valve means for said control pressure for adjusting a predetermined, substantially constant pressure value determined by control spring means during idling and low partial load operations of the driving engine;

adjusting sleeve means operatively connected with a control member of said driving engine for output control of said engine;

a pressure member, said control slide valve means being actuatable in response to an increase of said control pressure by said pressure member from said adjusting sleeve means by resilient means when said control member is moved beyond a predetermined position corresponding to a low partial load in a direction toward a full load position;

hydraulic damping means for delaying response of said control slide valve means with respect to said adjusting sleeve means, including two damping members of piston-cylinder-type construction which are movable relative to one another and enclose therebetween a damping chamber means containing a hydraulic damping medium, one of said damping members being rigidly supportable against a housing means and the other damping member which is movable relative to said housing means being actuatable by said pressure member and thereby displacing damping medium out of said damping chamber means against action of at least one throttle means; wherein said damping means is arranged at an end face of said control slide valve means facing said pressure member and said damping member movable relative to said housing means being immovably connected with said pressure member, and said damping chamber means being operatively connected by relief valve means with a space that is at least under atmospheric pressure.

2. An arrangement according to claim 1, wherein said damping member operating as a cylinder is connected with said pressure member, and said damping member operating as a piston is connected with support sleeve means used for supporting the control spring means at said housing means.

3. An arrangement according to claim 2, further comprising a further pressure member having at least two abutments arranged inside said support sleeve means, said further pressure member being movable with respect to said support sleeve means, at least one of said abutments being located inside of said support sleeve means and engageable with said control slide valve means, at least another of said abutments being located at a cross arm extending through a corresponding opening of said support sleeve means outside of said support sleeve means and engageable with an open end face of said damping member operating as a cylinder.

4. An arrangement according to claim 2, wherein an end face of said support sleeve means opposite said control slide valve means is a valve seat for said relief valve means.

5. An arrangement according to claim 2, wherein said damping member rigidly supportable with respect to said housing means is arranged in a pressure chamber forming part of said space which is essentially pressure-relieved and is operatively connected with said damping chamber means by said throttle means.

6. An arrangement according to claim 5, wherein said damping member operating as a piston carries ring seal means cooperating with an internal cylinder wall of said other damping member.

7. An arrangement according to claim 6, wherein said damping member operating as a piston includes said throttle means.

8. An arrangement according to claim 6, wherein a further pressure member having at least two abutments is arranged inside said support sleeve means, said further pressure member being movable with respect to said support sleeve means, at least one of said abutments being located inside of said support sleeve means and engageable with said control slide valve means, at least another of the abutments being located at a cross arm extending through a corresponding opening of said support sleeve means outside of said support sleeve means and engageable with said damping member operating as a cylinder.

9. An arrangement according to claim 8, wherein said two damping members are supported with respect to one another by return spring means.

10. An arrangement according to claim 9, wherein said return spring means is supported between two mutually immovable spring abutments of said one damping member, and further comprising a movable spring abutment ring inserted between one spring end of said return spring means and the associated immovable spring abutment which cooperates with a spring abutment of said other damping member.

11. An arrangement according to claim 10, wherein an end face of the support sleeve means opposite said control slide valve means is a valve seat for said relief valve means.

12. An arrangement according to claim 11, wherein said relief valve means includes a valve closure member provided with said throttle means.

13. An arrangement according to claim 10, wherein said two mutually immovable spring abutments for said return spring means act on said damping member operating as a piston.

14. An arrangement according to claim 13, wherein said spring abutments which are immovable relative to one another for said return spring means are connected to a spring abutment sleeve means which is arranged in the damping chamber means and is mounted over an adjacent end of said support sleeve means and has radial flow apertures.

15. An arrangement according to claim 14, wherein said ring seal means mutually sealing the two damping members is seated on a section of said support sleeve means reduced in diameter and is held in one direction of the sleeve axis by an adjacent end face of said spring abutment sleeve means.

16. An arrangement according to claim 15, further comprising sieve means inserted into a central passage of said support sleeve means.

17. An arrangement according to claim 16, wherein said throttle means is located between said sieve means and said damping chamber means.

18. An arrangement according to claim 1, wherein said damping member rigidly supportable with respect to said housing means is arranged in a pressure chamber forming part of said space which is essentially pressure-relieved and is operatively connected with said damping chamber means via the throttle means.

19. An arrangement according to claim 1, wherein said damping member operating as a piston carries ring seal means cooperating with an internal cylinder wall of said other damping member.

20. An arrangement according to claim 17, wherein said ring seal means mutually sealing the two damping members is seated on a section of a support sleeve means reduced in diameter and is held in one direction of the sleeve axis by an adjacent end face of a spring abutment sleeve means.

21. An arrangement according to claim 1, wherein said damping member operating as a piston includes said throttle means.

22. An arrangement according to claim 1, wherein said two damping members are supported with respect to one another by return spring means.

23. An arrangement according to claim 22, wherein said return spring means is supported between two mutually immovable spring abutments of said one damping member, and further comprising a movable spring abutment ring inserted between one spring end and the associated immovable spring abutment which cooperates with a spring abutment of the other damping member.

24. An arrangement according to claim 23, wherein said two mutually immovable spring abutments for said return spring means act on said damping member operating as a piston.

25. An arrangement according to claim 23, wherein said spring abutments which are immovable relative to one another for said return spring means are connected to spring abutment sleeve means which is arranged in said damping chamber means and is mounted over an adjacent end of said support sleeve means and has radial flow apertures.

26. An arrangement according to claim 1, wherein said relief valve means includes a valve closure member provided with said throttle means.

27. An arrangement according to claim 1, further comprising sieve means inserted into a central passage of support sleeve means.

28. An arrangement according to claim 27, wherein said throttle means is effectively located between said sieve means and said damping chamber means.

* * * * *